US006801656B1

(12) United States Patent
Colmenarez et al.

(10) Patent No.: US 6,801,656 B1
(45) Date of Patent: Oct. 5, 2004

(54) METHOD AND APPARATUS FOR DETERMINING A NUMBER OF STATES FOR A HIDDEN MARKOV MODEL IN A SIGNAL PROCESSING SYSTEM

(75) Inventors: Antonio J. Colmenarez, Peekskill, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 695 days.

(21) Appl. No.: 09/706,668

(22) Filed: Nov. 6, 2000

(51) Int. Cl.⁷ .............................................. G06K 9/62
(52) U.S. Cl. .................... 382/159; 382/160; 382/228
(58) Field of Search ................... 704/256; 382/228, 382/118, 159, 160, 186, 187–189

(56) References Cited

U.S. PATENT DOCUMENTS

| | | | |
|---|---|---|---|
| 4,903,305 A | | 2/1990 | Gillick et al. .................. 381/41 |
| 5,289,562 A | | 2/1994 | Mizuta et al. .................. 395/2 |
| 5,502,774 A | * | 3/1996 | Bellegarda et al. .......... 382/159 |
| 6,078,884 A | | 6/2000 | Downey ....................... 704/243 |
| 6,118,890 A | * | 9/2000 | Senior .......................... 382/125 |
| 6,157,731 A | * | 12/2000 | Hu et al. ...................... 382/119 |
| 6,460,017 B1 | * | 10/2002 | Bub et al. ..................... 704/256 |

FOREIGN PATENT DOCUMENTS

| | | | |
|---|---|---|---|
| EP | 0685835 B1 | 12/1995 | ............. G10L/5/06 |
| EP | 0750293 A2 | 12/1996 | ............. G10L/5/06 |
| JP | 1138993 | 12/1999 | ............. G10L/3/00 |

OTHER PUBLICATIONS

Tosuka, T. and Ohya, J. "Spotting segments displaying facial expression from image sequence using HMM", Automatic Face and Gesture Recognition, 1998, pp.: 442–447.*

"A Probablistic Framework for Embedded Face and Facial Expression Recognition", Antonio Colmenarez et al, Int'l Conference on Computer Vision and Pattern Recognition (CVPR), 1999.

"Embedded Face and Facial Expression Recognition", Antonio Colmenarez et al, Int'l Conference on Image Processing (ICIP), 1999.

"Pattern Detection with Information–Based Maximum Discrimination and Error Bootstrapping", Antonio J. Colmenarez et al.

"Facial Analysis From Continuous Video With Application to Human–Computer Interface",Antonio J. Colmenarez, PHd. Dissertation, University of Illinois at Urbana–Champaign, Mar. 1999.

"Detection and Tracking of Faces and Facial Features", Antonio Colmenarez et al, Int'l Conference on Image Processing (ICIP), 1999.

A. Colmenarez et al; "Detection and Tracking of Faces and Facial Features", Image Processing, 1999, ICIP 99. Proceedings 1999 International Conference on Kobe, Japan Oct. 24–28, 1999, Piscataway, NJ, USA, IEEE, pp. 657–661, XP010369128.

M. Brand; "Pattern Discovery via Entropy Minimization" Mitsubishi Electric Research Laboratory Technical Reports, Online, Oct. 1, 1998, XP002194147.

* cited by examiner

*Primary Examiner*—Samir Ahmed
*Assistant Examiner*—Brian Le
(74) *Attorney, Agent, or Firm*—Edward W. Goodman

(57) ABSTRACT

A signal processing system processes a signal using a hidden Markov model (HMM) having a number of states determined at least in part based on application of an iterative algorithm to the model. The iterative algorithm adjusts the number of states of the model, based at least in part on closeness measures computed between the states, until the model satisfies a specified performance criterion. The model having the adjusted number of states is then utilized to determine a characteristic of the signal, and an action of the signal processing system is controlled based on the determined characteristic.

30 Claims, 6 Drawing Sheets

METHOD AND APPARATUS FOR DETERMINING A NUMBER OF STATES FOR A HIDDEN MARKOV MODEL IN A SIGNAL PROCESSING SYSTEM

FIELD OF THE INVENTION

The present invention relates generally to the field of signal processing systems, and more particularly to image signal processing and other types of signal processing techniques involving the use of hidden Markov models (HMMs).

BACKGROUND OF THE INVENTION

A variety of well-known signal processing techniques make use of HMMs. For example, HMMs have been used in the analysis of image sequences to recognize facial expressions. Facial expressions are complex, spatio-temporal motion patterns. The movements associated with a given facial expression are generally divided into three periods: (i) onset, (ii) apex, and (iii) offset. These periods correspond to the transition towards the facial expression, the period sustaining the peak in expressiveness, and the transition back from the expression, respectively. The rate of change in the onset period as well as the duration in the apex period are often related to the intensity of the underlying emotion associated with the facial expression.

HMMs have been specifically designed in this context to take advantage of the spatio-temporal character of facial expression patterns. Examples of facial expression recognition techniques based on HMMs are described in T. Otsuka et al., "Recognizing Abruptly Changing Facial Expressions From Time-Sequential Face Images," International Conference on Computer Vision and Pattern Recognition (CVPR), 1998; and T. Otsuka et al., "Recognizing Multiple Persons≦ Facial Expression Using HMM Based on Automatic Extraction of Significant Frames from Image Sequences," International Conference on Image Processing (ICIP), pp. 546–549, 1997.

The HMMs used in the above-described facial expression context as well as in other signal processing applications may be sequential HMMs. Sequential HMMs, which are also known as left-to-right HMMs, are typically used to model sequential data for pattern recognition, analysis, etc. The sequential data generally represent linear trajectories in multi-dimensional spaces. For example, the sequential data may represent the path followed by a set of facial feature points in an abstract multi-dimensional space of facial expressions, when a face is observed over time for facial expression recognition.

A significant problem which arises in the conventional use of sequential HMMs and other types of HMMs in signal processing applications is related to the determination of an appropriate number of states for the HMM. In general, it is necessary to specify the number of states in the HMM prior to using the HMM to process actual data. Unfortunately, existing techniques for determining the number of states are deficient in that such techniques are generally unable to provide a model which best matches a given set of training data.

SUMMARY OF THE INVENTION

The invention provides methods and apparatus for determining an appropriate number of states in a hidden Markov model (HMM) using an iterative algorithm which adjusts the number of states based on an inter-state closeness measure. The resulting HMM is utilized to process data in a signal processing system and an action in the system is taken based on a result of the processing operation.

In accordance with one aspect of the invention, a signal processing system processes a signal using an HMM having a number of states determined at least in part based on application of an iterative algorithm to the model. The iterative algorithm adjusts the number of states of the HMM starting from an initial or default number of states, based at least in part on closeness measures computed between the states, until the HMM satisfies a specified performance criterion. For example, the iterative algorithm may iteratively increase or decrease the number of states until an average separation between the states is within a predefined range. The HMM having the adjusted number of states is then utilized to determine a characteristic of the signal, and an action of the signal processing system is controlled based on the determined characteristic.

In an illustrative embodiment, the signal to be processed using the HMM having an adjusted number of states is a sequence of images, and the HMM is used to determine an intensity of a particular facial expression likely to be present in the sequence of images.

In accordance with another aspect of the invention, the inter-state closeness measure is in the form of a mutual entropy computed along a line that passes through a pair of points, each of the points representing a most likely point in a feature space associated with a corresponding state of the HMM.

In accordance with a further aspect of the invention, a first iterative algorithm is used to adjust the number of states of the HMM if an expected number of states of the HMM is above a specified number, and a second iterative algorithm is used to adjust the number of states of the HMM if the expected number of states of the HMM is at or below the specified number. The specified number of states may be on the order of ten states. The first iterative algorithm may be configured to perform local closeness tests and to allow multiple states to be added and deleted from the model on each iteration. The second iterative algorithm may be configured to perform a global closeness test and to allow only one state to be added or deleted from the model on each iteration.

Advantageously, the invention allows the determination of an appropriate number of states in a HMM based on a set of training data, such that the resulting model performs with substantially greater accuracy than a model generated by assignment of a fixed number of states. The techniques of the invention can be used in a wide variety of signal processing applications, including video-camera-based systems such as video conferencing systems and video surveillance and monitoring systems, speech recognition systems, and human-machine interfaces.

DETAILED DESCRIPTION OF THE INVENTION

The present invention in an illustrative embodiment to be described herein provides techniques for determining an appropriate number of states in a sequential HMM or other type of HMM, using an iterative algorithm that evaluates if the HMM has too many states that are redundant or if it needs more states in order to best fit a given set of training data. An HMM having the determined number of states may be used in a signal processing application to process data such that at least one action in the system is controlled based at least in part on a result of the processing. For example, an HMM generated in accordance with the invention may be used to estimate facial expression intensity in an image processing system, as will be described in greater detail below.

Figure 1:
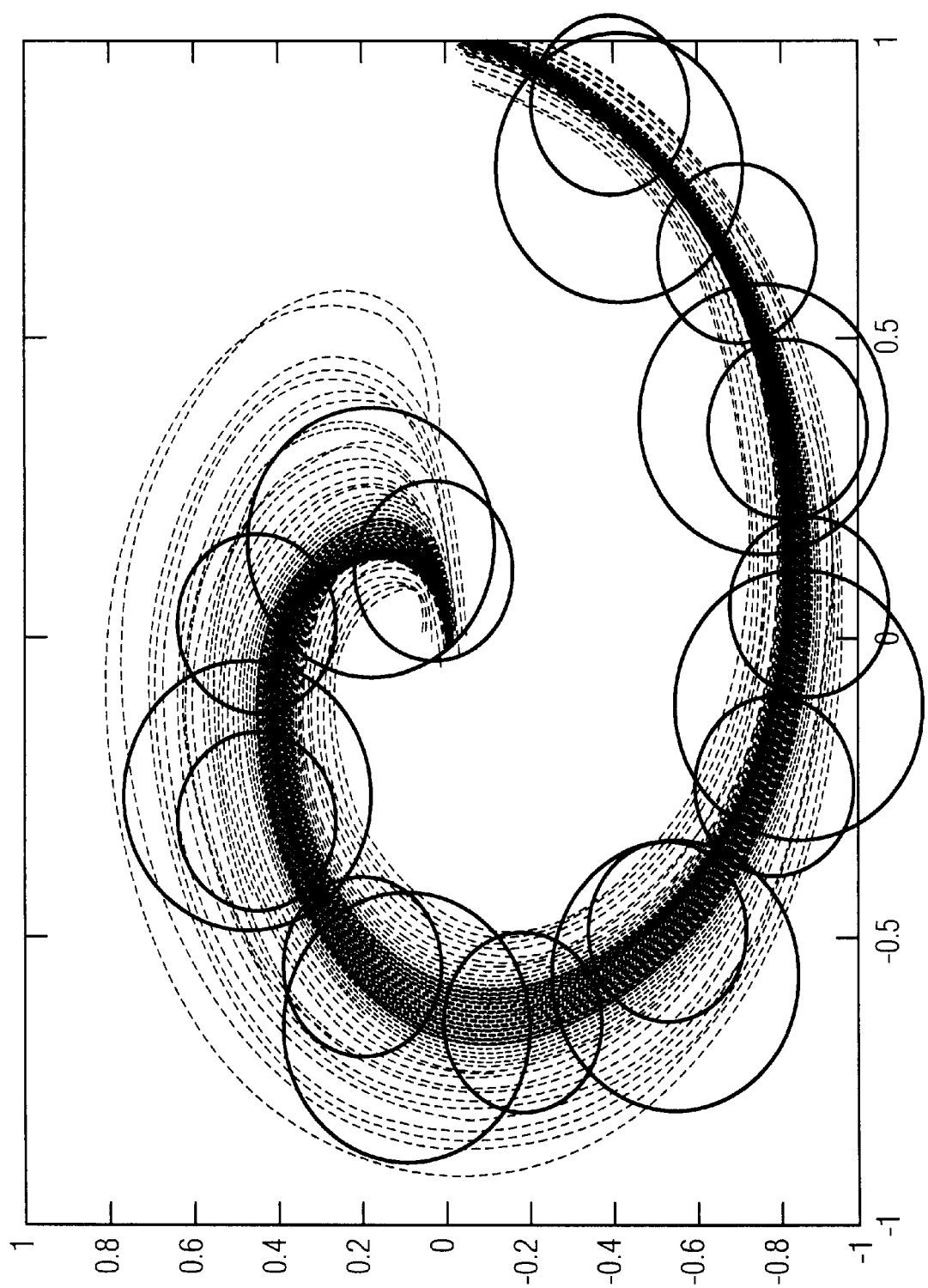
FIG. 1 illustrates the manner in which hidden Markov models (HMMs) with different numbers of states can be fit to the same set of training data.

FIG. 1 shows an example of a set of sequential training data plotted as a number of linear trajectories in a two-dimensional space. For example, as noted previously, the sequential data trajectories may each represent a path followed by a set of facial feature points in an abstract multi-dimensional space of facial expressions, when a face is observed over time for facial expression recognition. The training data correspond to dashed lines in the figure. The circles in the figure represent states of HMMs that may be used to model the data. More particularly, the small circles represent the states of one HMM that may be used to model the data, and the larger circles represent the states of another HMM that may be used to model the data. Both of the HMMs model the training data, but one has more states than the other. The present invention provides techniques for determining the number of states that best represents the given set of training data.

In the illustrative embodiment of the invention, an iterative algorithm is used to adjust the number of states of the HMM until a specified performance criterion is satisfied. More particularly, the algorithm starts with a default number of states and measures the average separation between the states using a closeness measure to be described in greater detail below. Then, the number of states is iteratively increased or decreased until the average separation is within a predefined range, or until satisfaction of another specified performance criterion.

In a case in which a change in the number of states is needed, initial values for the parameters of the new set of HMM states are computed based on those of the previous HMM states. The parameter computation may be implemented using a well-known conventional Expectation-Maximization (EM) algorithm. Advantageously, this approach of the illustrative embodiment significantly reduces the computational expense of the iterative algorithm in that it reduces the number of processing steps needed for parameter estimation.

The above-noted inter-state closeness measure utilized in the illustrative embodiment of the invention will now be described in greater detail. In this embodiment, the closeness measure represents a type of mutual entropy, which is also known as Kullback-Leibler divergence, computed along a line that passes through the most likely points in the feature space associated with a given pair of states. Other embodiments can use other types of closeness measures, e.g., closeness measures based on other types of divergence measures.

Figure 2:
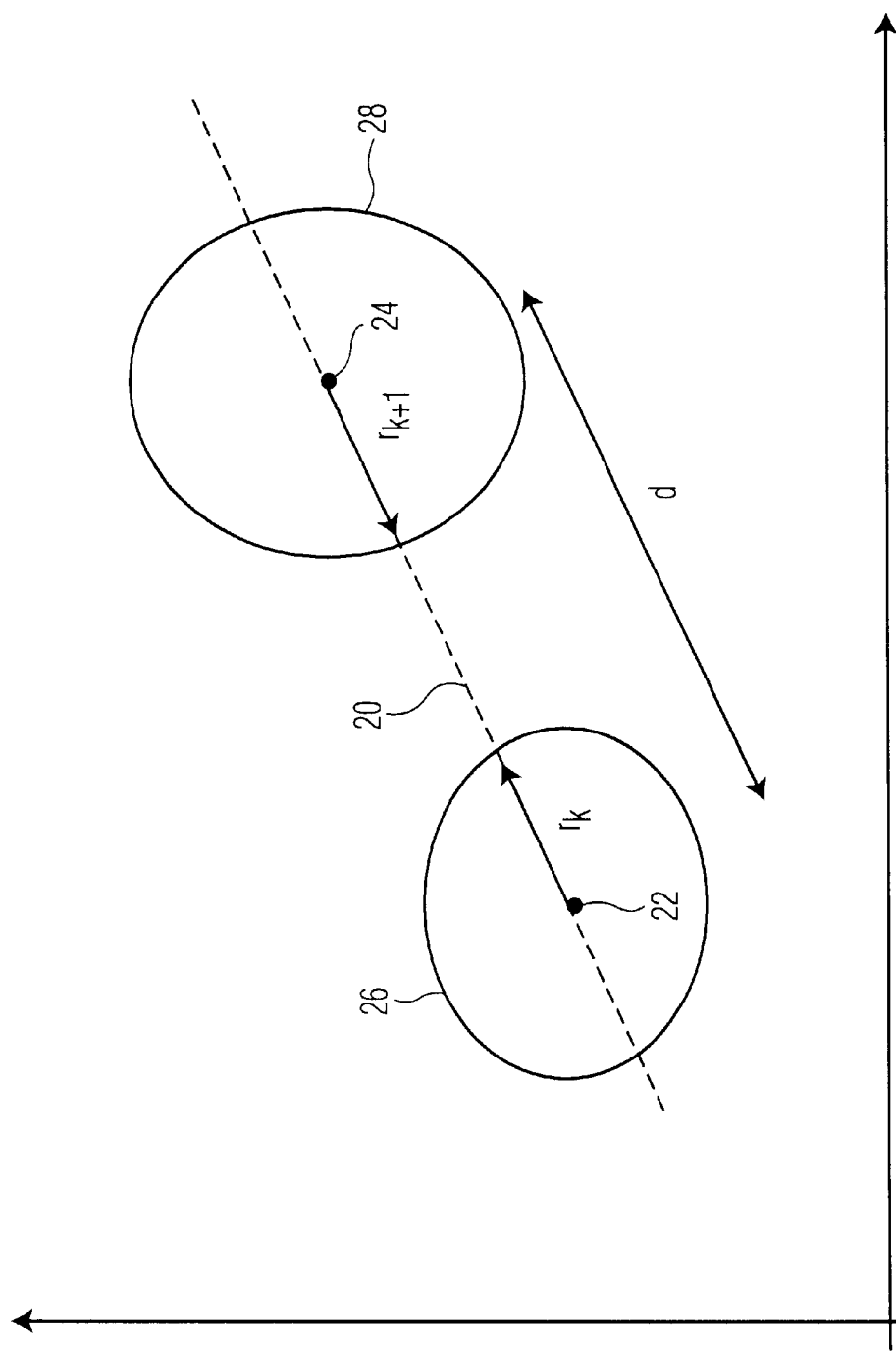
FIG. 2 shows an inter-state closeness measure utilized in an iterative algorithm for determining an appropriate number of HMM states in accordance with the invention.

FIG. 2 shows a general illustration of the closeness measure of the illustrative embodiment. The measure is shown in this example as a distance d along a line 20 between most likely points 22 and 24 associated with states 26 and 28, respectively. Also shown are vectors $r_k$ and $r_{k+1}$ associated with the states 26 and 28, respectively.

A more detailed explanation of the closeness measure d of FIG. 2 will now be provided. Let $P_1(x)$ and $P_2(x)$ be the probability functions of two states. Let $x_0^1$ and $x_0^2$ be the most likely points in each state, i.e.

$$x_0 = \arg\max_x P(x).$$

The closeness between the two states having probability functions $P_1(x)$ and $P_2(x)$ is then determined as follows:

$$H(P_1, P_2) = \int_{-\infty}^{+\infty} P_1(v_0 + \alpha v_1) \log \frac{P_1(v_0 + \alpha v_1)}{P_2(v_0 + \alpha v_1)} d\alpha$$

where $v_0 = x_0^1$, $v_1 = x_0^2 - x_0^1$, and $\alpha$ denotes an integration variable which varies from $-\infty$ to $+\infty$.

It should be noted that this closeness measure is provided by way of example only. Numerous other types of closeness measures may also be used in conjunction with the present invention, as will be apparent to those skilled in the art. As another example, one possible variation of the above-described closeness measure is as follows:

$$H(P_1, P_2) = \int_{-\infty}^{+\infty} [P_1(v_0 + \alpha v_1) - P_2(v_0 + \alpha v_1)] \log \frac{P_1(v_0 + \alpha v_1)}{P_2(v_0 + \alpha v_1)} d\alpha.$$

Figure 3:
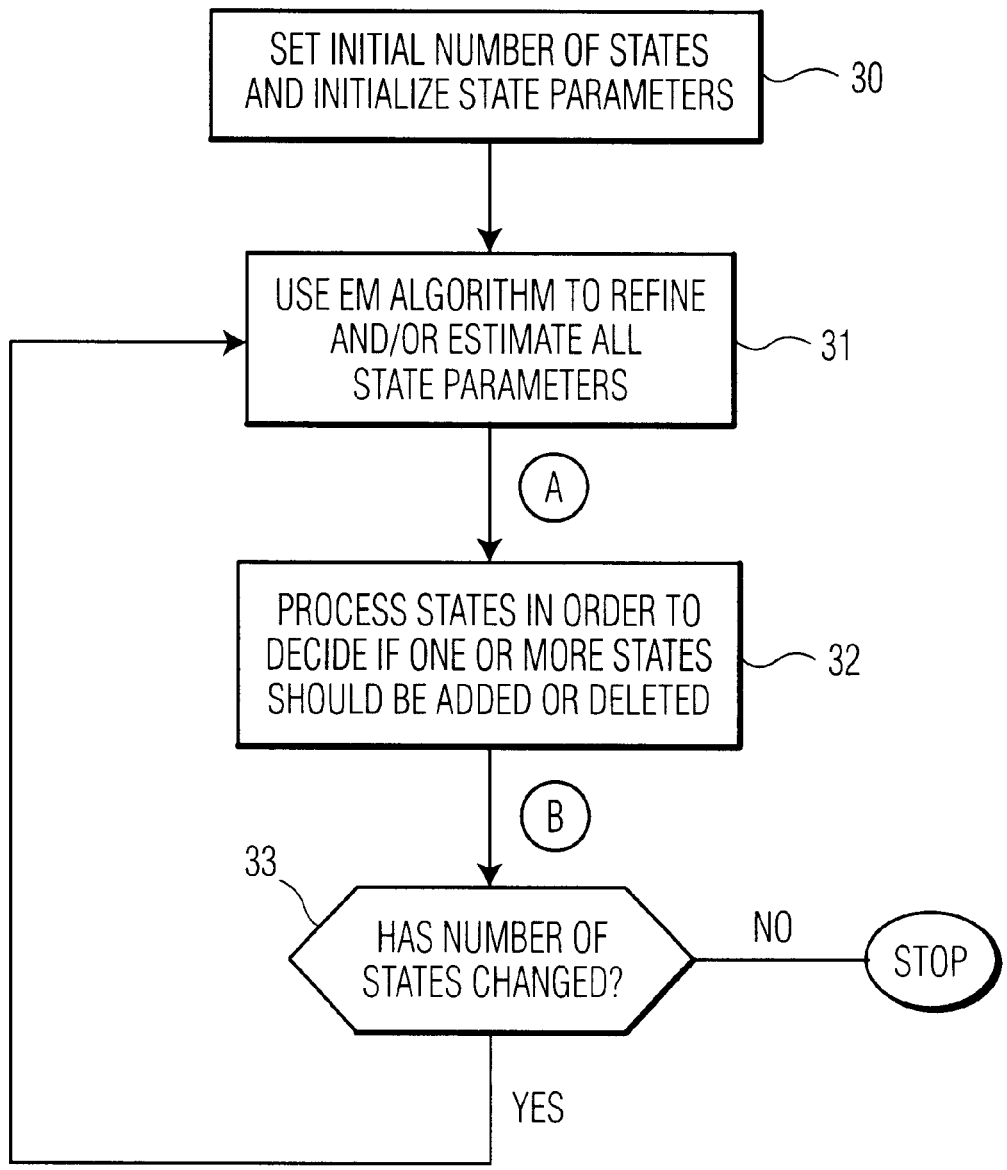
FIG. 3 is a flow diagram of an example process for adjusting the number of states in an HMM in accordance with the invention.

FIG. 3 shows a flow diagram of a process for adjusting the number of states in an HMM in accordance with the present invention. In step 30, an initial number of states is set for the HMM, and the state parameters are initialized, using conventional techniques. The above-noted EM algorithm is then utilized in step 31 to refine and/or estimate all of the state parameters of the HMM. The EM algorithm is described in greater detail in, e.g., B. J. Frey, "Graphical Models for Machine Learning and Digital Communication," MIT Press, Cambridge, Mass., 1998, which is incorporated by reference herein.

Step 32 processes the states of the HMM in order to determine if one or more states should be added or deleted. In step 33, a determination is made as to whether the number of states in the HMM has changed as a result of the processing in step 32. If the number of states has not changed, the process ends. The process may also be terminated based on other conditions not illustrated in the flow diagram, such as termination after a fixed number of iterations, or termination upon detection of a looping condition. If the number of states is determined in step 33 to have changed, the process returns to step 31. The process of FIG. 3 thus continues until the step 32 processing indicates that no states need to be added to or deleted from the HMM, or until one of the other termination conditions noted above is satisfied.

The invention in the illustrative embodiment described herein uses two different iterative algorithms for adjusting the number of states in an HMM, with the particular algorithm being selected based on the expected number of states in the HMM. These iterative algorithms each correspond to step 32 of the FIG. 3 flow diagram. For HMMs having an expected number of states which is large, e.g., greater than about ten states, local closeness tests are performed and multiple states can be added and deleted on each iteration. For HMMs having relatively fewer states, e.g., less than or equal to about ten states, a global closeness test is performed and only one state is added or deleted on each iteration. The two different iterative algorithms are described in greater detail below in conjunction with FIGS. 4 and 5.

Figure 4:
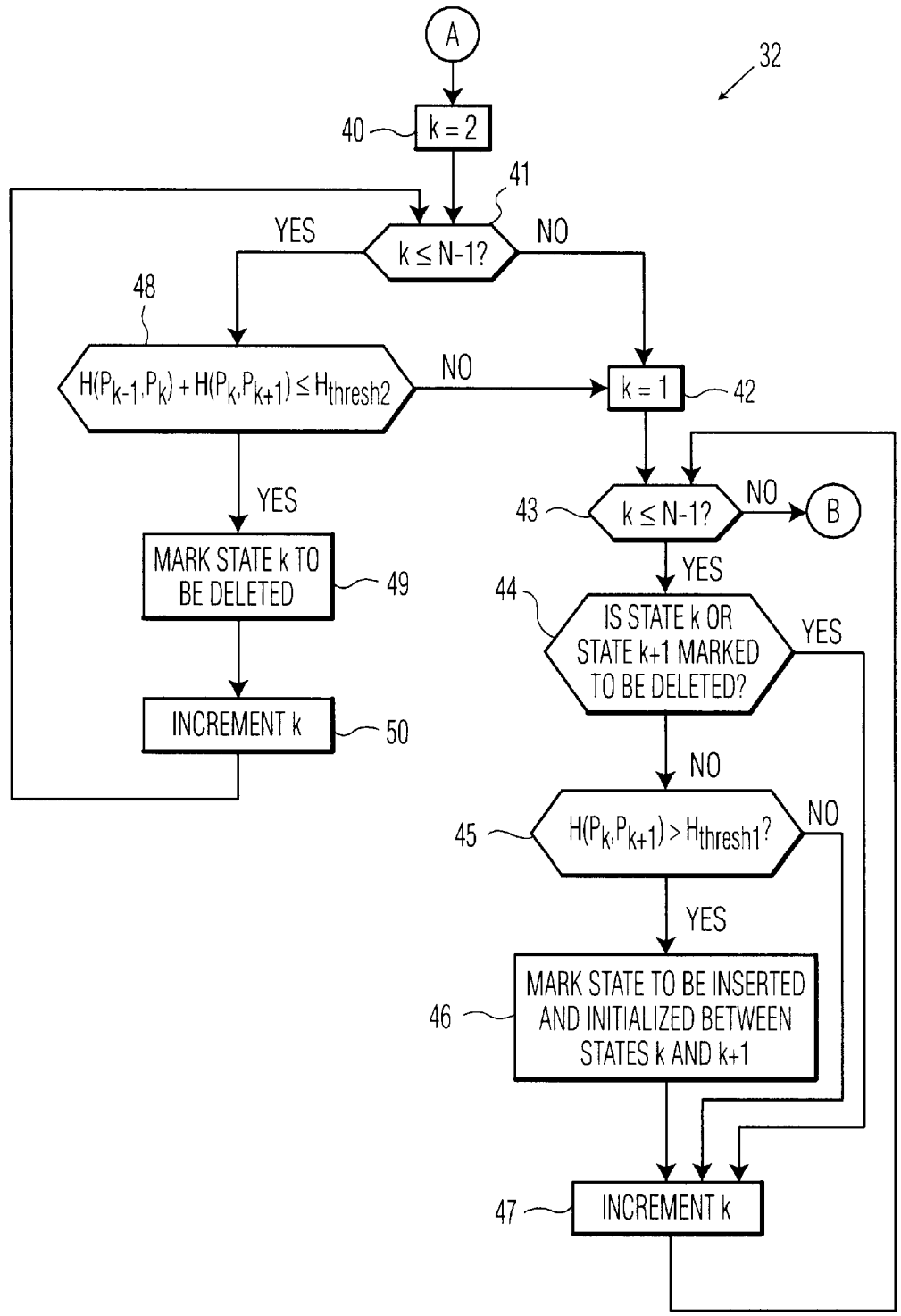
FIG. 4 is a flow diagram of an iterative algorithm for use in the FIG. 3 process based on a local closeness test in an application involving a large number of states.

FIG. 4 shows a flow diagram of the iterative algorithm for use with an HMM having a large number of expected states, e.g., greater than about ten states. As previously noted, the iterative algorithm shown in the FIG. 4 flow diagram corresponds generally to step 32 of the FIG. 3 flow diagram.

In step 40, a state index variable k is initialized by setting it equal to 2. Step 41 then checks if k is less than or equal to N−1, where N in this example is assumed to represent a specified maximum number of states.

If k is not less than or equal to N−1 in step 41, the value of k is set to 1 in step 42. Step 43 then again checks if k is less than or equal to N−1. If not, the process returns to point B in the FIG. 3 flow diagram, i.e., step 32 is considered complete. If k is less than or equal to N−1 in step 43, step 44 checks if state k or state k+1 is marked to be deleted. If not, step 45 determines if $H(P_k,P_{k+1})$ is greater than a first threshold $H_{thresh1}$. If $H(P_k, P_{k+1})>H_{thresh1}$, then step 46 marks a state for insertion and initialization between states k and k+1, and the process moves to step 47 to increment the value of k.

If state k or state k+1 is determined in step 44 to be marked to be deleted, or if the result of the determination in step 45 is "NO," the process moves directly to step 47 to increment k without adding a state. After k is incremented in step 47, the process returns to step 43. Once k is determined in step 43 to be greater than N−1, the process returns to point B in the FIG. 3 flow diagram.

If k is determined to be less than or equal to N−1 in step 41, a determination is then made in step 48 as to whether the sum of $H(P_{k-1},P_k)$ and $H(P_k,P_{k+1})$ is less than or equal to a second threshold $H_{thresh2}$. If $H(P_{k-1}, P_k)+H(P_k, P_{k+1}) \leq H_{thresh2}$, then state k is marked to be deleted, as indicated in step 49. The value of k is then incremented in step 50, and the process returns to step 41. If the result of the determination in step 48 is "NO," the process moves to step 42, where the value of k is again set to 1.

Figure 5:
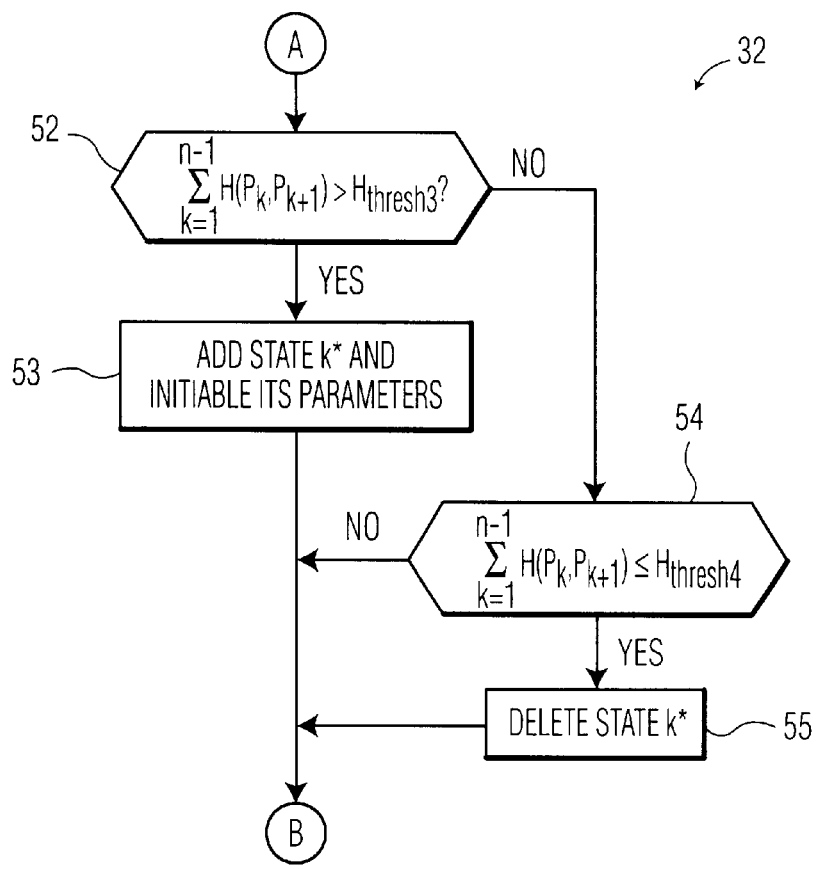
FIG. 5 is a flow diagram of an iterative algorithm for use in the FIG. 3 process based on a global closeness test in an application involving a small number of states.

FIG. 5 shows a flow diagram of the iterative algorithm for use with an HMM having a small number of expected states, e.g., less than or equal to about ten states. Again, the iterative algorithm shown corresponds generally to step 32 of the FIG. 3 flow diagram. A determination is made in step 52 as to whether the sum of the $H(P_k, P_{k+1})$ values for k from 1 to n−1 is greater than a third threshold $H_{thresh3}$, where n denotes a current number of states in the HMM. If $$\sum_{k=1}^{n-1} H(P_k, P_{k+1}) > H_{thresh3},$$

then a new state k* is introduced in the model, as indicated in step 53, where $$k^* = 1 + \underset{k}{\mathrm{argmin}}[H(P_k, P_{k+1})],$$

and its parameters are initialized in a conventional manner. The process then returns to point B in the FIG. 3 flow diagram. If the result of the determination in step 52 is "NO," a determination is made in step 54 as to whether the sum of the $H(P_k, P_{k+1})$ values is less than or equal to a fourth threshold $H_{thresh4}$. If $$\sum_{k=1}^{n-1} H(P_k, P_{k+1}) \leq H_{thresh4},$$

then state k* is deleted as shown in step 55, where $$k^* = 1 + \underset{k}{\mathrm{argmax}}[H(P_k, P_{k+1}) + H(P_k, P_{k-1})],$$

after which the process returns to point B of FIG. 3.

The first, second, third and fourth thresholds used in the iterative algorithms described above will generally vary depending upon the application. These thresholds may be determined based at least in part on a tradeoff between number of iterations and a desired level of performance. For example, one or more of the thresholds can be obtained by trial and error with synthetically generated data first, and then tuned with data from a specific application. Of course, the ultimate measure of the quality of a particular model produced using a given set of thresholds is its recognition performance when implemented in a given signal processing system.

The third and fourth thresholds in the illustrative embodiment may be functions of the first and second thresholds, respectively. For example, the third threshold may be computed as n times the first threshold, where n as previously noted is the number of states in the model at the current iteration. Similarly, the fourth threshold may be computed as the second threshold times n/2.

The first and second thresholds may also be functions of one another. For example, the second threshold may be computed as the product of the first threshold and a predetermined factor. The factor in this case is used to avoid an infinite loop in the iterative algorithm, and may be on the order of 0.8.

The operation of the present invention in an example signal processing system will now be described with reference to FIGS. 6 and 7.

Figure 6:
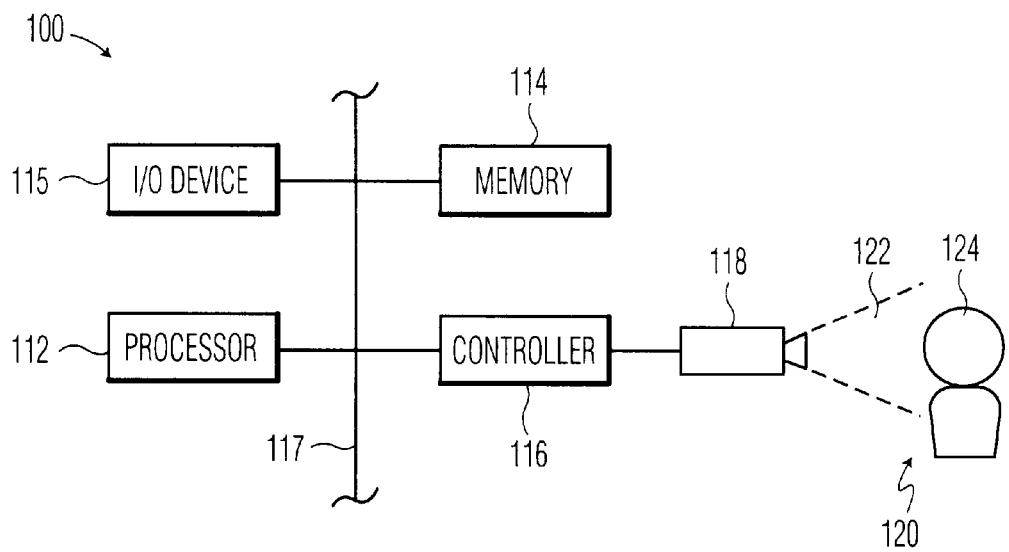
FIG. 6 is a block diagram of an example image processing system in which the present invention may be implemented.

FIG. 6 shows an image processing system 100 which implements facial expression estimation techniques using an HMM having a number of states determined in accordance with the present invention. The system 100 includes a processor 112, a memory 114, an input/output (I/O) device 115 and a controller 116, all of which are connected to communicate over a set 117 of one or more system buses or other type of interconnections.

The system 100 further includes a camera 118 that is coupled to the controller 116 as shown. The camera 118 may be, e.g., a mechanical pan-tilt-zoom (PTZ) camera, a wide-angle electronic zoom camera, or any other suitable type of image capture device. It should therefore be understood that the term "camera" as used herein is intended to include any type of image capture device or any configuration of multiple such devices.

The system 100 may be adapted for use in any of a number of different image processing applications, including, e.g., video conferencing, video surveillance, human-machine interfaces, etc. More generally, the system 100 can be used in any application that can benefit from utilization of an HMM generated in accordance with the techniques of the invention.

In operation, the image processing system 100 generates a video signal or other type of sequence of images of a person 120. The camera 118 may be adjusted such that a head 124 of the person 120 comes within a field of view 122 of the camera 118. A video signal corresponding to a sequence of images generated by the camera 118 and including a face of the person 120 is then processed in system 100 using facial expression estimation techniques based on an HMM to be described in greater detail below.

Figure 7:
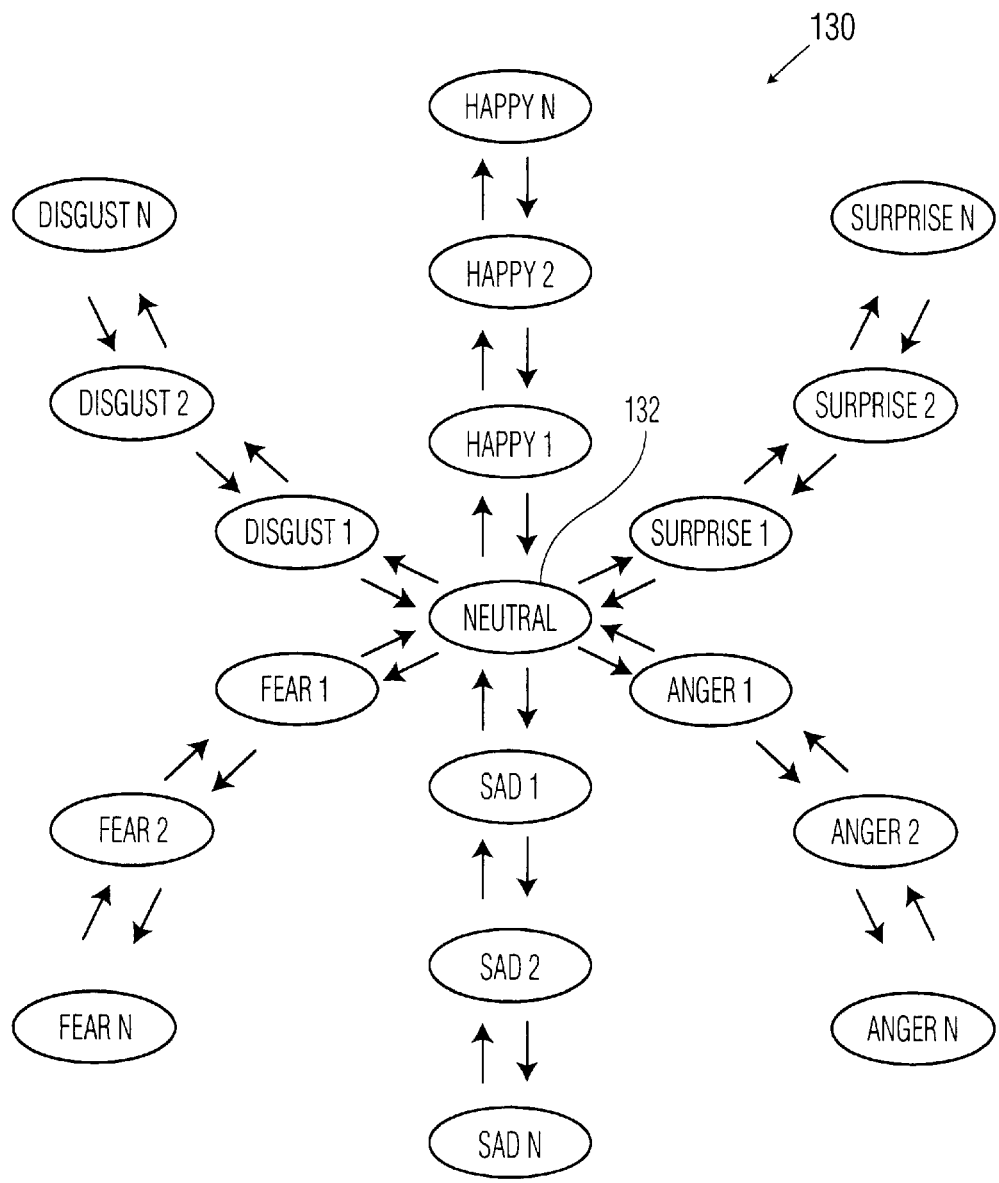
FIG. 7 shows an example of a bidirectional star topology HMM for which the number of states may be determined using the techniques of the invention.

The sequence of images may be processed so as to determine a particular expression that is on the face of the person 120 within the images, based at least in part on an estimation of the intensity or other characteristic of the expression as determined using a bidirectional star topology HMM as shown in FIG. 7. An output of the system may then be adjusted based on the determined expression. For example, a human-machine interface or other type of system application may generate a query or other output or take another type of action based on the determined expression. Any other type of control of an action of the system may be based at least in part on the determined expression and/or a particular characteristic thereof, such as intensity.

Elements or groups of elements of the system 100 may represent corresponding elements of an otherwise conventional desktop or portable computer, as well as portions or combinations of these and other processing devices. Moreover, in other embodiments of the invention, some or all of the functions of the processor 112, memory 114, controller 116 and/or other elements of the system 100 may be combined into a single device. For example, one or more of the elements of system 100 may be implemented as an application specific integrated circuit (ASIC) or circuit card to be incorporated into a computer, television, set-top box or other processing device.

The term "processor" as used herein is intended to include a microprocessor, central processing unit (CPU), microcontroller, digital signal processor (DSP) or any other data processing element that may be utilized in a given data processing device. In addition, it should be noted that the memory 114 may represent an electronic memory, an optical or magnetic disk-based memory, a tape-based memory, as well as combinations or portions of these and other types of storage devices.

Additional details regarding facial expression estimation techniques that may be implemented in the system 100 using an HMM having a number of states determined in accordance with the invention can be found in U.S. patent application Ser. No. 09/705,666 entitled "Estimation of Facial Expression Intensity Using a Bidirectional Star Topology Hidden Markov Model," filed Nov. 3, 2000 in the name of inventors A. Colmenarez and S. Gutta, which application is incorporated by reference herein.

FIG. 7 shows an example of a bidirectional star topology HMM 130 having a single neutral expression state 132, as described in the above-cited U.S. Patent Application. From the neutral expression state 132 there are a set of six different paths, each corresponding to a particular facial expression and each including a total of N states. In this example, the facial expressions modeled are happy, sad, anger, fear, disgust and surprise. For simplicity, each expression is modeled with a path of multiple interconnected states. In addition, it is assumed that forward and return paths, which correspond to respective onset and offset periods of the expression, are the same. The neutral expression is modeled with a single state, the neutral expression state 132. The neutral state 132 is connected to the first state of each facial expression path. In the case of an expression observation that reaches the highest expression intensity modeled, all of the states of the path are visited, first in forward order and then in backward order, returning to the neutral expression state 132.

Assuming that sufficient data is available for training, the bidirectional star topology HMM of FIG. 7 captures the evolution of facial expressions at all levels of intensity. Each state represents one step towards the apex or maximum level of expressiveness which corresponds to the last state in the corresponding facial expression path. During subsequent facial expression analysis, an observation does not necessarily have to reach the last state in the path. Therefore, one can measure the intensity of the observed facial expression using the highest state visited in the path as well as the duration of its visit to that state.

The separation between two consecutive states in the HMM 130 of FIG. 7 can be determined using the above-described closeness measures.

An appropriate number of states for each path in the HMM 130 is determined as follows, using the techniques of the present invention. Each path is first trained by assuming a default number of states and measuring the average separation between the states. Then, the number of states is iteratively increased or reduced, using the process of FIG. 3 and one of the iterative algorithms of FIGS. 4 and 5, and the HMM path is thereby retrained until the average separation is within a predefined range.

Although each path in the FIG. 7 HMM is shown as including the same number of states N, this is by way example and not limitation. In other embodiments, each of the paths may include a different number of states, with the above-described procedures used to determine the appropriate number of states for a given expression path of the HMM.

It should be understood that the HMM 130 of FIG. 7 is only an example of one type of HMM that may be generated in accordance with the techniques of the present invention. The invention can be used with a wide variety of other types of HMMs.

The above-described embodiments of the invention are intended to be illustrative only. For example, the invention can be used in numerous image processing systems, including video conferencing systems, video surveillance systems, and other camera-based systems, as well as other types of signal processing systems which utilize HMMs. The invention can also be implemented at least in part in the form of one or more software programs which are stored on an electronic, magnetic or optical storage medium and executed by a processing device, e.g., by the processor 112 of system 100. These and numerous other embodiments within the scope of the following claims will be apparent to those skilled in the art.

What is claimed is:

1. A method for use in processing a signal in a signal processing system, the method comprising the steps of:

processing the signal using a hidden Markov model having a number of states determined at least in part based on application of an iterative algorithm to the model, the iterative algorithm adjusting the number of states of the model, based at least in part on closeness measures computed between the states, until the model satisfies a specified performance criterion, wherein the model having the determined number of states is utilized to determine a characteristic of the signal; and controlling an action of the signal processing system based on the determined characteristic of the signal, wherein the closeness measure for a given pair of states of the model is computed as:

$$H(P_1, P_2) = \int_{-\infty}^{+\infty} P_1(v_0 + \alpha v_1) \log \frac{P_1(v_0 + \alpha v_1)}{P_2(v_0 + \alpha v_1)} d\alpha$$

where $H(P_1, P_2)$ denotes the closeness measure, $\alpha$ is an integration variable, $P_1(x)$ and $P_2(x)$ are probability functions of the two states, $x_0^1$ and $x_0^2$ are the most likely points in each state, $$x_0 = \operatorname*{argmax}_x P(x),$$

$v_0 = x_0^1$ and $v_1 = x_0^2 - x_0^1$.

2. The method as claimed in claim 1, wherein the signal comprises a sequence of images, and the determined characteristic comprises an intensity of a particular facial expression present in the sequence of images.

3. The method as claimed in claim 1, wherein the iterative algorithm is applied to an initial number of states of the model.

4. The method as claimed in claim 3, wherein the initial number of states comprises a default number of states for the model.

5. The method as claimed in claim 1, wherein the iterative algorithm iteratively increases or decreases the number of states until an average separation between the states is within a predefined range.

6. The method as claimed in claim 1, wherein the closeness measure comprises a mutual entropy computed along a line that passes through a pair of points, each of the points representing a most likely point in a feature space associated with a corresponding state of the model.

7. The method as claimed in claim 1, wherein the iterative algorithm comprises a selected one of a plurality of algorithms, the selection of a particular one of the algorithms being based at least in part on an expected number of states of the model.

8. The method as claimed in claim 1, wherein a first iterative algorithm is used to adjust the number of states of the model if an expected number of states of the model is above a specified number, and a second iterative algorithm is used to adjust the number of states of the model if the expected number of states of the model is at or below the specified number.

9. The method as claimed in claim 8, wherein the specified number of states comprises approximately ten states.

10. The method as claimed in claim 8, wherein the first iterative algorithm performs local closeness tests and allows multiple states to be added and deleted from the model on each iteration.

11. The method as claimed in claim 8, wherein the second iterative algorithm performs a global closeness test and allows only one state to be added or deleted from the model on each iteration.

12. The method as claimed in claim 1, wherein the controlling step comprises generating an output of the signal processing system based on the determined characteristic of the signal.

13. The method as claimed in claim 1, wherein the controlling step comprises altering an operating parameter of the signal processing system based on the determined characteristic of the signal.

14. An apparatus for use in processing a signal in a signal processing system, the apparatus comprising:

a processor-baaed device operative: (i) to process the signal using a hidden Markov model having a number of states determined at least in part based on application of an iterative algorithm to the model, the iterative algorithm adjusting the number of states of the model, based at least in part on closeness measures computed between the states, until the model satisfies a specified performance criterion, wherein the model having the determined number of states is utilized to determine a characteristic of the signal; and (ii) to control an action of the signal processing system based on the determined characteristic of the signal, wherein the closeness measure for a given pair of states of the model is computed as:

$$H(P_1, P_2) = \int_{-\infty}^{+\infty} P_1(v_0 + \alpha v_1) \log \frac{P_1(v_0 + \alpha v_1)}{P_2(v_0 + \alpha v_1)} d\alpha$$

where $H(P_1, P_2)$ denotes the closeness measure, $\alpha 0$ is an integration variable, $P_1(x)$ and $P_2(x)$ are probability functions of the two stated, $x_0^1$ and $x_0^2$ are the most likely points in each state, $$x_0 = \operatorname*{argmax}_x P(x),$$

$v_0 = x_0^1$ and $v_1 = x_0^{2-x_0^1}$.

15. An article of manufacture comprising a storage medium for storing one or more programs for use in processing a signal in a signal processing system, wherein the one or more programs when executed by a processor implement the step of:

processing the signal using a hidden Markov model having a number of states determined at least in part based on application of an iterative algorithm to the model, the iterative algorithm adjusting the number of states of the model, based at least in part on closeness measures computed between the states, until the model satisfies a specified performance criterion, wherein the model having the determined number of states is utilized to determine a characteristic of the signal, wherein an action of the signal processing system is controlled based on the determined characteristic, and wherein the closeness measure for a given pair of states of the model is computed as:

$$H(P_1, P_2) = \int_{-\infty}^{+\infty} P_1(v_0 + \alpha v_1) \log \frac{P_1(v_0 + \alpha v_1)}{P_2(v_0 + \alpha v_1)} d\alpha$$

where $H(P_1, P_2)$ denotes the closeness measure, $\alpha$ is an integration variable, $P_1(x)$ and $P_2(x)$ are probability functions of the two states, $x_0^1$ and $x_0^2$ are the most likely points in each state, $$x_0 = \operatorname*{argmax}_x P(x),$$

$v_0 = x_0^1$ and $v_1 = x_0^2 - x_0^1$.

16. A method for use in processing a signal in a signal processing system, the method comprising the steps of:

processing the signal using a hidden Markov model having a number of states determined at least in part based on application of an iterative algorithm to the model, the iterative algorithm adjusting the number of states of the model, based at least in part on closeness measures computed between the states, until the model satisfies a specified performance criterion, wherein the model having the determined number of states is utilized to determine a characteristic of the signal; and controlling an action of the signal processing system based on the determined characteristic of the signal, wherein the closeness measure for a given pair of states of the model is computed as:

$$H(P_1, P_2) = \int_{-\infty}^{+\infty} [P_1(v_0 + \alpha v_1) - P_2(v_0 + \alpha v_1)] \log \frac{P_1(v_0 + \alpha v_1)}{P_2(v_0 + \alpha v_1)} d\alpha$$

where $H(P_1, P_2)$ denotes the closeness measure, $\alpha$ is an integration variable, $P_1(x)$ and $P_2(x)$ are probability functions of the two states, $x_0^1$ and $x_0^2$ are the most likely points in each state, $$x_0 = \operatorname*{argmax}_x P(x),$$

$v_0 = x_0^1$ and $v_1 = x_0^2 - x_0^1$.

17. The method as claimed in claim 16, wherein the signal comprises a sequence of images and the determined characteristic comprises an intensity of a particular facial expression present in the sequence of images.

18. The method as claimed in claim 16, wherein the iterative algorithm is applied to an initial number of states of the model.

19. The method as claimed in claim 18, wherein the initial number of states comprises a default number of states for the model.

20. The method as claimed in claim 16, wherein the iterative algorithm iteratively increases or decreases the number of states until an average separation between the states is within a predefined range.

21. The method as claimed in claim 16, wherein the closeness measure comprises a mutual entropy computed along a line that passes through a pair of points, each of the points representing a most likely point in a feature space associated with a corresponding state of the model.

22. The method as claimed in claim 16, wherein the iterative algorithm comprises a selected one of a plurality of algorithms, the selection of a particular one of the algorithms being based at least in part on an expected number of states of the model.

23. The method as claimed in claim 16, wherein a first iterative algorithm is used to adjust the number of states of the model if an expected number of states of the model is above a specified number, and a second iterative algorithm is used to adjust the number of states of the model if the expected number of states of the model is at or below the specified number.

24. The method as claimed in claim 23, wherein the specified number of states comprises approximately ten states.

25. The method as claimed in claim 23, wherein the first iterative algorithm performs local closeness tests and allows multiple states to be added and deleted from the model on each iteration.

26. The method as claimed in claim 23, wherein the second iterative algorithm performs a global closeness test and allows only one state to be added or deleted from the model on each iteration.

27. The method as claimed in claim 16, wherein the controlling step comprises generating an output of the signal processing system based on the determined characteristic of the signal.

28. The method as claimed in claim 16, wherein the controlling step comprises altering an operating parameter of the signal processing system based on the determined characteristic of the signal.

29. An apparatus for use in processing a signal in a signal processing system, the apparatus comprising:

a processor-based device operative: (i) to process the signal using a hidden Markov model having a number of states determined at least in part based on application of an iterative algorithm to the model, the iterative algorithm adjusting the number of states of the model, based at least in part on closeness measures computed between the states, until the model satisfies a specified performance criterion, wherein the model having the determined number of states is utilized to determine a characteristic of the signal; and (ii) to control an action of the signal processing system based on the determined characteristic of the signal, wherein the closeness measure for a given pair of states of the model is computed as:

$$H(P_1, P_2) = \int_{-\infty}^{+\infty} [P_1(v_0 + \alpha v_1) - P_2(v_0 + \alpha v_1)] \log \frac{P_1(v_0 + \alpha v_1)}{P_2(v_0 + \alpha v_1)} d\alpha$$

where $H(P_1, P_2)$ denotes the closeness measure, $\alpha$ is an integration variable, $P_1(x)$ and $P_2(x)$ are probability functions of the two states, $x_0^1$ and $x_0^2$ are the most likely points in each state, $$x_0 = \operatorname*{argmax}_x P(x),$$

$v_0 = x_0^1$ and $v_1 = x_0^2 - x_0^1$.

30. An article of manufacture comprising a storage medium for storing one or more programs for use in processing a signal in a signal processing system, wherein the one or more programs when executed by a processor implement the step of: processing the signal using a hidden Markov model having a number of states determined at least in part based on application of an iterative algorithm to the model, the iterative algorithm adjusting the number of states of the model, based at least in part on closeness measures computed between the states, until the model satisfies a specified performance criterion, wherein the model having the determined number of states is utilized to determine a characteristic of the signal, wherein an action of the signal processing system is controlled based on the determined characteristic, and wherein the closeness measure for a given pair of states of the model is computed as:

$$H(P_1, P_2) = \int_{-\infty}^{+\infty} [P_1(v_0 + \alpha v_1) - P_2(v_0 + \alpha v_1)] \log \frac{P_1(v_0 + \alpha v_1)}{P_2(v_0 + \alpha v_1)} d\alpha$$

where $H(P_1, P_2)$ denotes the closeness measure, $\alpha$ is an integration variable, $P_1(x)$ and $P_2(x)$ are probability functions of the two states, $x_0^1$ and $x_0^2$ are the most likely points in each state, $$x_0 = \operatorname*{argmax}_x P(x),$$

$v_0 = x_0^1$ and $v_1 = x_0^2 - x_0^1$.

* * * * *